(12) United States Patent
Rajagopalan

(10) Patent No.: US 12,381,840 B2
(45) Date of Patent: Aug. 5, 2025

(54) PROVIDING NOTIFICATIONS ACROSS USER DEVICES

(71) Applicant: Dell Products L.P., Round Rock, TX (US)

(72) Inventor: Vivekanandh Narayanasamy Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 404 days.

(21) Appl. No.: 18/051,709

(22) Filed: Nov. 1, 2022

(65) Prior Publication Data

US 2024/0146682 A1    May 2, 2024

(51) Int. Cl.
*G06F 15/173*    (2006.01)
*H04L 51/224*    (2022.01)

(52) U.S. Cl.
CPC .................................. *H04L 51/224* (2022.05)

(58) Field of Classification Search
CPC ........ H04L 51/224; H04L 67/10; G06F 9/542
USPC ........................ 709/223, 224, 217, 203, 206
See application file for complete search history.

(56) References Cited

U.S. PATENT DOCUMENTS

| 2007/0299958 | A1* | 12/2007 | Hu .......................... H04L 67/55 709/223 |
| 2009/0055838 | A1* | 2/2009 | Sedukhin ............ G06F 11/3612 719/318 |
| 2009/0132731 | A1* | 5/2009 | Nakamura ......... H04N 1/00278 710/19 |
| 2014/0201289 | A1* | 7/2014 | Wheeler ............... G06F 16/176 709/204 |
| 2019/0058772 | A1* | 2/2019 | Ruiz-Meraz ........ H04L 67/1008 |
| 2019/0065246 | A1* | 2/2019 | Senapaty ............... G06F 9/5088 |
| 2024/0126515 | A1* | 4/2024 | Meyer ..................... G06F 9/543 |

* cited by examiner

*Primary Examiner* — Kaylee J Huang
(74) *Attorney, Agent, or Firm* — Kirton McConkie; Brian Tucker

(57) ABSTRACT

Notifications can be provided across user devices. A notification gateway can be configured to receive notification requests from a variety of publishers. The notification requests can identify a channel type over which notifications should be sent to user devices that an administrator uses. The notification gateway can deliver each notification request to a topic that is associated with the defined channel type. Dispatchers subscribed to the topics can receive the notification requests. Each dispatcher can use the content of a notification request to generate and send notifications over the respective channel type to each user device used by an administrator identified in the notification request.

20 Claims, 11 Drawing Sheets

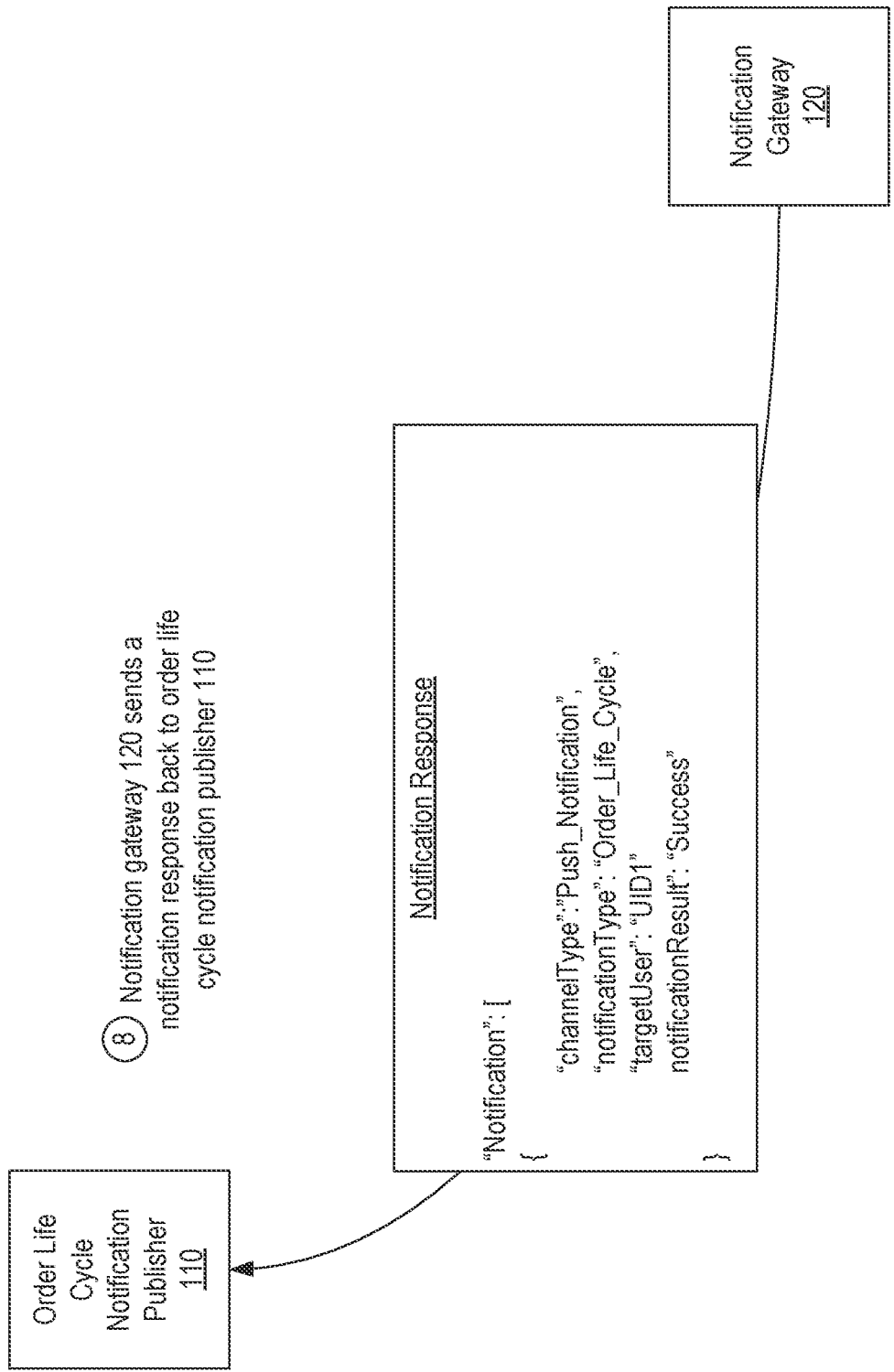

Notification Request

```
"Notification": [
  {
    "channelType":"All_Channels",
    "notificationType": "System_Health",
    "notificationId": "Battery_Health",
    "customArgument":[
      {
        "customArgument": "",
        "customArgumentValue": "5FC2E"
      }
    ],
    "targetUser": "UID1"
    "targetDevice": All
  }
]
```

*FIG. 4*

PROVIDING NOTIFICATIONS ACROSS USER DEVICES

CROSS-REFERENCE TO RELATED APPLICATIONS

N/A

BACKGROUND

Administrators, such as individual consumers and administrators of business entities, purchase various types of user devices for their personal or organizational use from original equipment manufacturers such as Dell, HP, Lenovo, etc. Such administrators oftentimes desire to receive notifications about the order life cycle (e.g., order confirmed, order shipped, order delivered, etc.) and critical system information (e.g., diagnostic information, remediation information, critical security fixes, etc.).

Currently, to be notified about the order life cycle for user devices, an administrator would access a webpage or mobile application of the OEM from a user device that the administrator uses, whereas to be notified about critical system information, the administrator would rely on services installed on the user devices themselves (e.g., Support Assist or Management Agent). There is not a uniform way of providing notifications to the administrator regarding user devices he or she may manage across all user devices he or she may use.

BRIEF SUMMARY

The present invention extends to systems, methods and computer program products for providing notifications across user devices. A notification gateway can be configured to receive notification requests from a variety of publishers. The notification requests can identify a channel type over which notifications should be sent to user devices that an administrator uses. The notification gateway can deliver each notification request to a topic that is associated with the defined channel type. Dispatchers subscribed to the topics can receive the notification requests. Each dispatcher can use the content of a notification request to generate and send notifications over the respective channel type to each user device used by an administrator identified in the notification request.

In some embodiments, the present invention may be implemented as a method for providing notifications across user devices. A notification gateway can receive a notification request from a first publisher. The notification request can identify a first channel type and a first administrator. The content of the notification request can be provided to a first dispatcher that is associated with the first channel type. The first dispatcher can identify user devices associated with the first administrator. The first dispatcher can then generate and send a notification to each of the user devices via the first channel type.

In some embodiments, the present invention may be implemented as a system that includes a notification gateway, a plurality of publishers that are configured to provide notification requests to the notification gateway, a plurality of topics, each topic being configured to receive notification requests from the notification that define a particular channel type, and a plurality of dispatchers, each dispatcher being configured to receive notification requests from a particular topic of the topics. For each notification request, the dispatcher can generate and send a notification to each of one or more user devices associated with an administrator identified in the notification request.

In some embodiments, the present invention may be implemented as computer storage media storing computer executable instructions which when executed implement a method for providing notifications across user devices. A notification gateway can receive a first notification request from a first publisher and a second notification request from a second publisher. The first notification request can identify a first channel type and a first administrator. The second notification request can identify a second channel type and the first administrator. Content of the first notification request can be provided to a first dispatcher that is associated with the first channel type. The first dispatcher can identify user devices associated with the first administrator. The first dispatcher can generate and send a first notification to each of the user devices via the first channel type. Content of the second notification request can be provided to a second dispatcher that is associated with the second channel type. The second dispatcher can identify the user devices associated with the first administrator. The second dispatcher can generate and send a second notification to each of the user devices via the second channel type.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3 and 3A-3G provide an example of how notifications can be provided across user devices in accordance with one or more embodiments of the present invention; and FIG. 4 provides an example of a notification request that a publisher may generate in accordance with one or more embodiments of the present invention.

DETAILED DESCRIPTION

Figure 1:
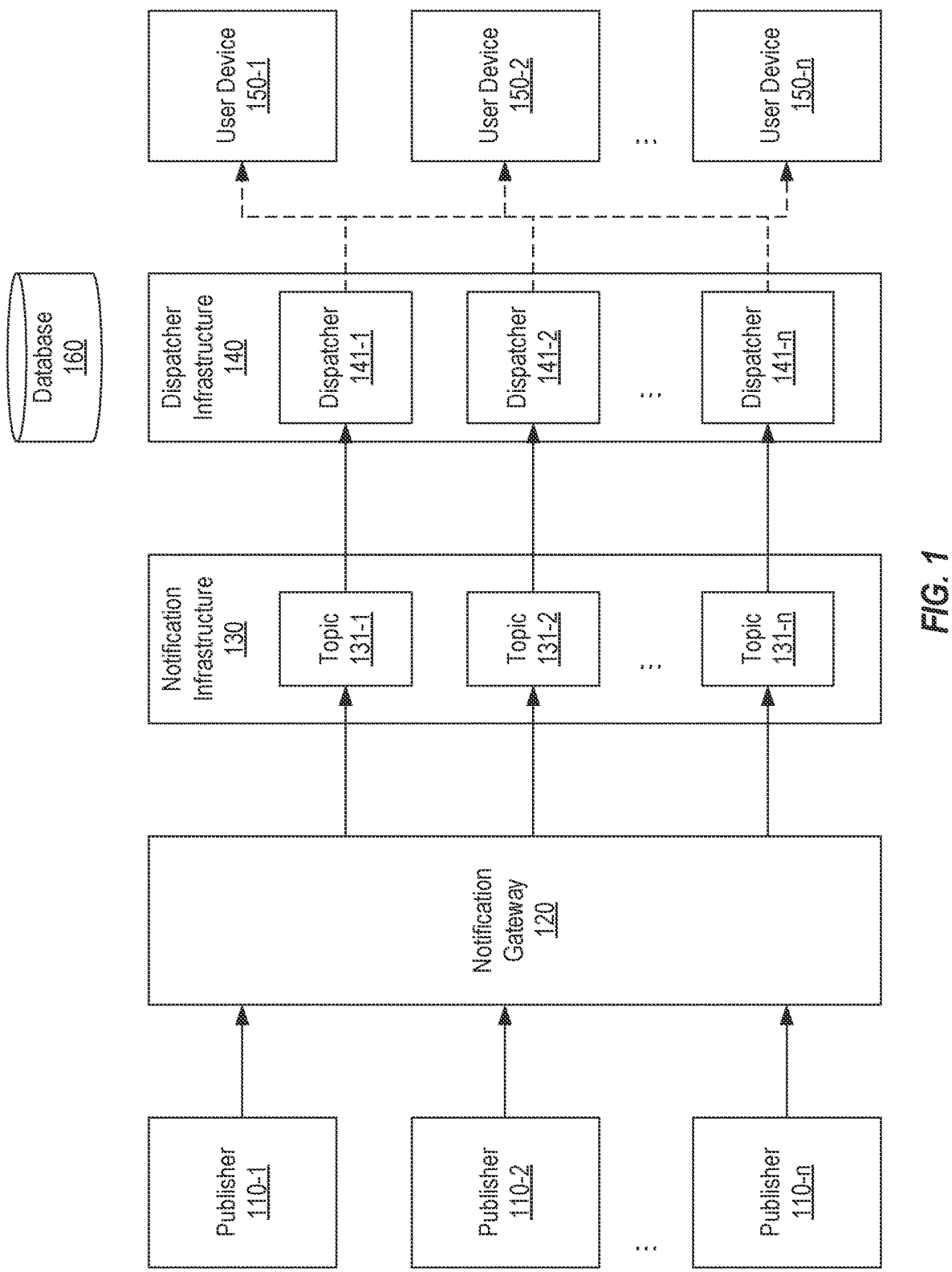
FIG. 1 provides an example of a computing environment in which embodiments of the present invention may be implemented.

FIG. 1 provides an example of a computing environment in which embodiments of the present invention may be implemented. This computing environment includes any number of publishers 110-1 through 110-*n* (generally publisher(s) 110), a notification gateway 120, a notification infrastructure 130 that includes any number of topics 131-1 through 131-*n* (generally topic(s) 131), a dispatcher infrastructure 140 that includes any number of dispatchers 141-1 through 141-*n* (generally dispatcher(s) 141), any number of user devices 150-1 through 150-*n* (generally user device(s) 150) and a database 160.

Publishers 110 can represent any service or other component that publish notifications that are to be delivered to user devices 150. For example, a publisher 110 could represent an OEM's order management service that publishes notifications regarding orders that an administrator has made (e.g., order confirmed, order shipped, order delivered, etc.), an OEM's warranty service that publishes notifications regarding warranties that cover user devices 150, a diagnostics/remediation service that publishes notifications regarding the status or health of user devices 150, etc.

Notification gateway 120 can represent any configuration of one or more hardware components that are accessible to publishers 110 to enable the functionality described herein to be implemented. For example, notification gateway 120 could be a standalone server computing device, a virtual machine, a container in a cloud infrastructure, etc.

Notification infrastructure 130 can represent the collection of topics 131 including the underlying hardware on which topics 131 are hosted. In some embodiments, notification infrastructure 130 can be implemented as a Kafka cluster. Each topic 131 can be configured to handle notifications that are to be delivered via a particular channel. For example, there may be topics 131 for an email channel, a push notification channel, an SMS channel, etc.

Dispatcher infrastructure 140 can represent the collection of dispatchers 141 including the underlying hardware on which dispatchers 141 are hosted. Database 160 can include information that dispatchers 141 may use as part of creating and dispatching notifications to user devices 150 as described below. User devices 150 can represent any type of computing device that a user (or administrator) may use such as a desktop, a laptop, a tablet, a smart phone, a virtual reality device, etc.

As an overview, notification gateway 120 can be configured to allow publishers 110, regardless of the type of notifications they publish or the channel over which the notifications are to be delivered, to publish notifications associated with an administrator that in turn will be delivered to each user device 150 that the administrator uses. In this context, an administrator should be construed as a user that manages user devices to which the notifications pertain. In some cases, these user devices that the administrator manages could include at least some of user devices 150. In other cases, these user devices that the administrator manages may not include user devices 150 to which the notifications are delivered (e.g., when the user device to which a notification pertains is not used by the administrator).

Figure 2:
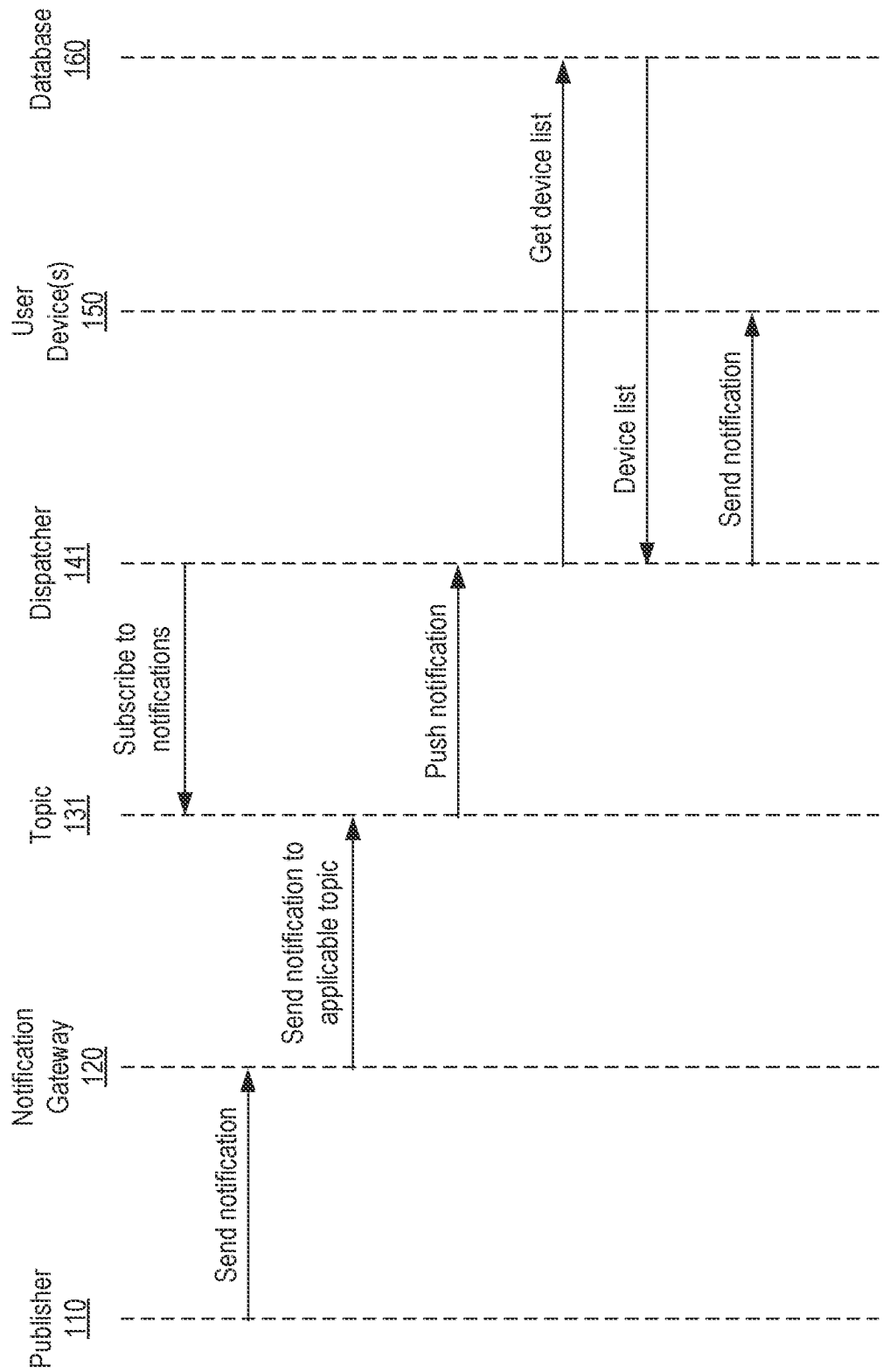
FIG. 2 is a flow diagram representing how notifications can be provided across user devices in accordance with one or more embodiments of the present invention.

FIG. 2 is a flow diagram representing how notifications can be provided across user devices in accordance with one or more embodiments of the present invention. Initially, a dispatcher 141 can subscribe to a topic 131 for the type of channel over which dispatcher 141 will deliver notifications. For example, a dispatcher 141 can be configured to deliver notifications as emails and could therefore subscribe to a topic 131 associated with an email channel type.

When a publisher 110 desires that a notification be delivered to a user, it can send the notification (or more specifically, a request to send a notification) to notification gateway 120. Notification gateway 120 can then determine over which channel the notification is to be sent and can provide the notification to the topic 131 for this channel. The topic 131 for this channel can then push the notification to any subscribed dispatcher 141. Dispatcher 141 can then access database 160 to obtain a device list identifying each user device 150 to which the notification should be sent. For example, dispatcher 141 can use information about a user that is contained in the notification to obtain a device list containing each user device 150 that the user uses. Dispatcher 141 may then send the notification to each user device 150 in the device list.

By providing notification gateway 120, each publisher 110 does not need to be aware of any of user devices 150 and does not need to be configured to deliver notifications via the desired channel. In other words, notification gateway 120 can abstract the complexities of delivering notifications across user devices 150.

Figure 3:
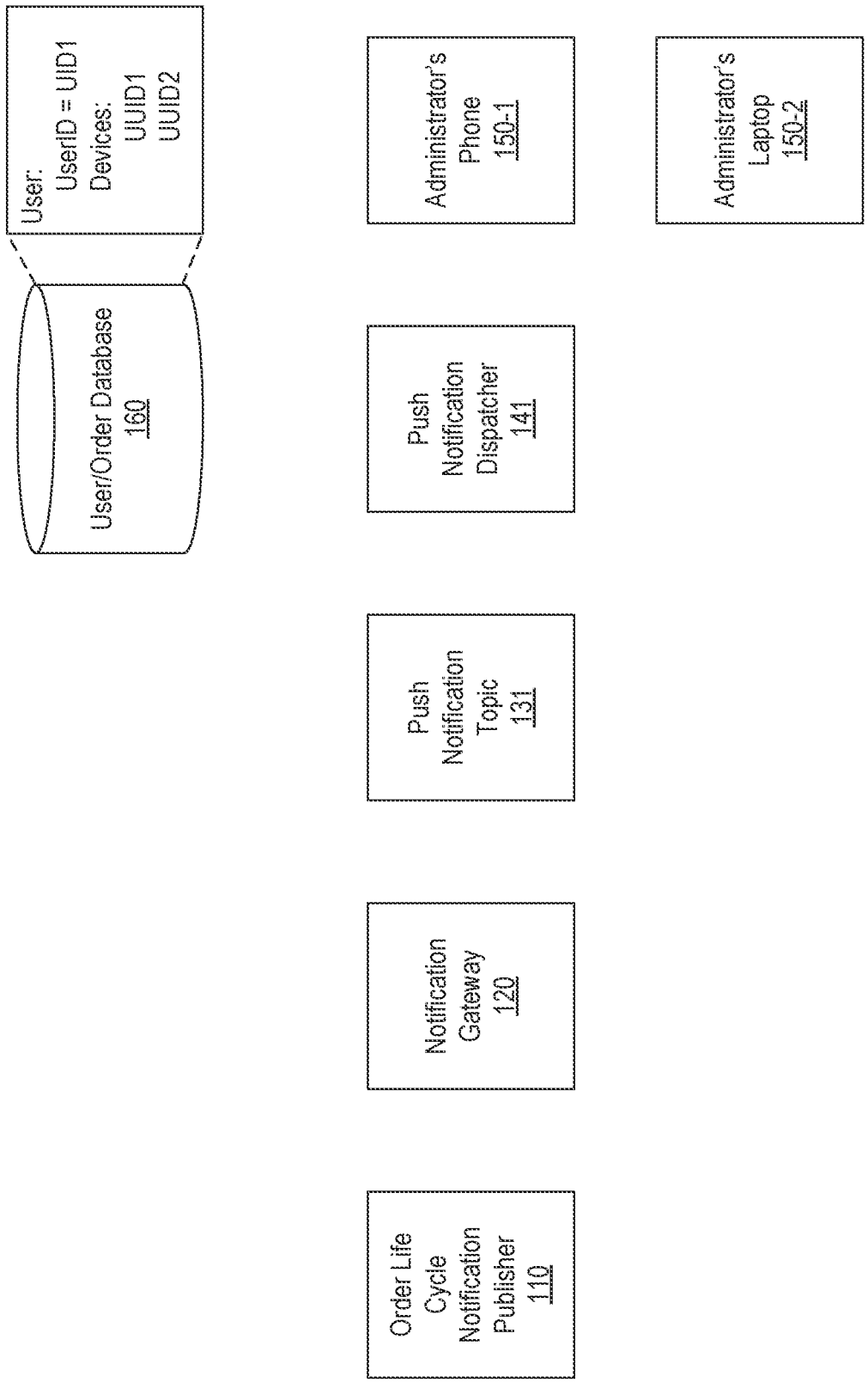

FIG. 3 represents a scenario where the computing environment includes an order life cycle notification publisher 110, a push notification topic 131, and a push notification dispatcher 141. In this example, it is assumed that an administrator uses two user devices 150, the administrator's phone 150-1 and the administrator's laptop 150-2. It is also assumed that the administrator has a user ID of UID1 and that the administrator's phone 150-1 and the administrator's laptop 150-2 have universally unique IDs (UUIDs) of UUID1 and UUID2 respectively, which information is defined in user/order database 160.

Figure 3A:
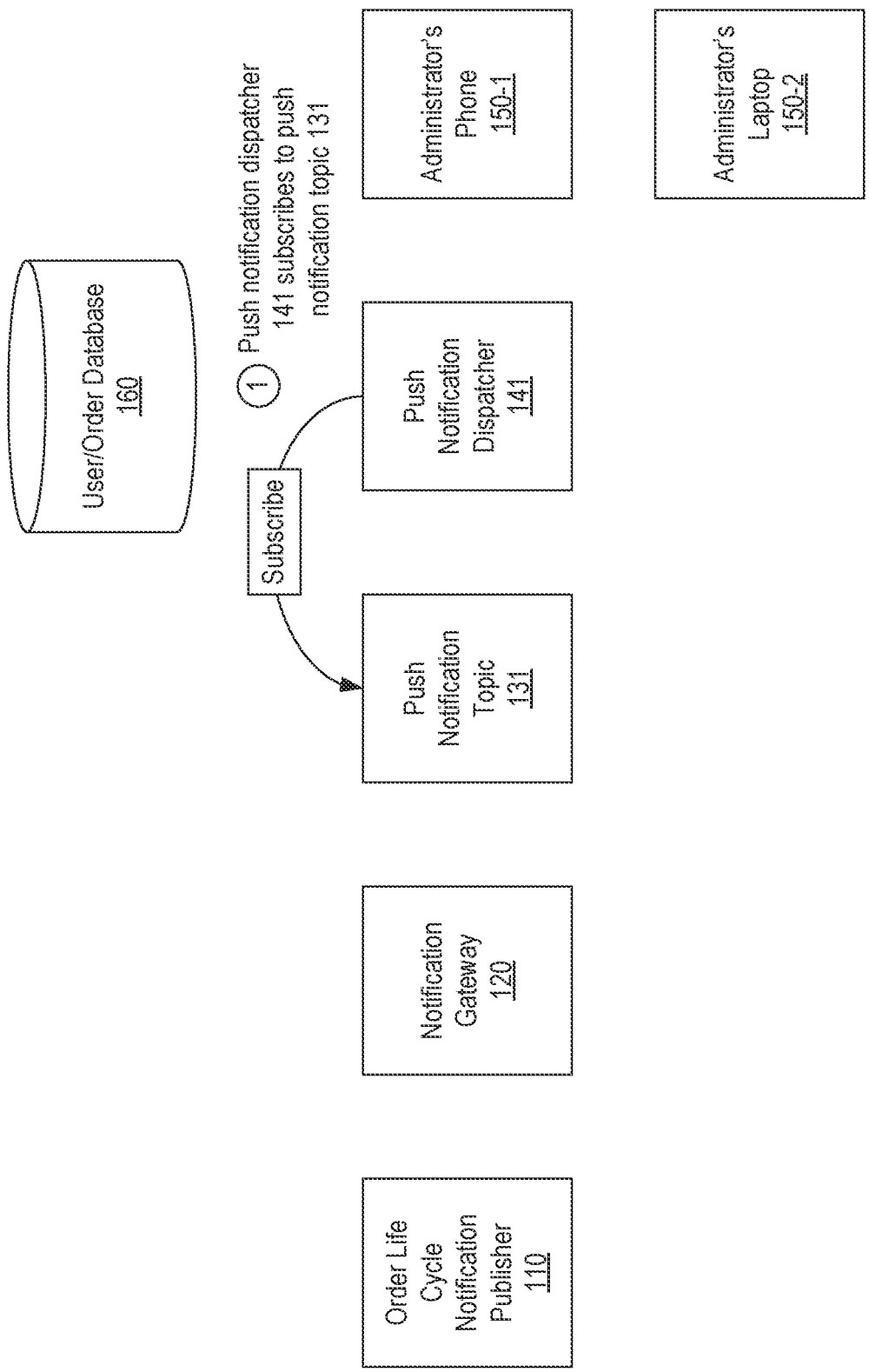

FIGS. 3A-3G provide an example of how notifications can be provided across user devices in the context of the computing environment of FIG. 3. Turning to FIG. 3A, in step 1, push notification dispatcher 141 can subscribe to push notification topic 131. For example, notification infrastructure 130 could provide an application programming interface (API) by which push notification dispatcher 141 can subscribe to receive event streams from push notification topic 131. In such a case, the event stream that push notification topic 131 pushes to subscribing dispatchers 141 could include push notifications (or content defining push notifications).

Figure 3B:
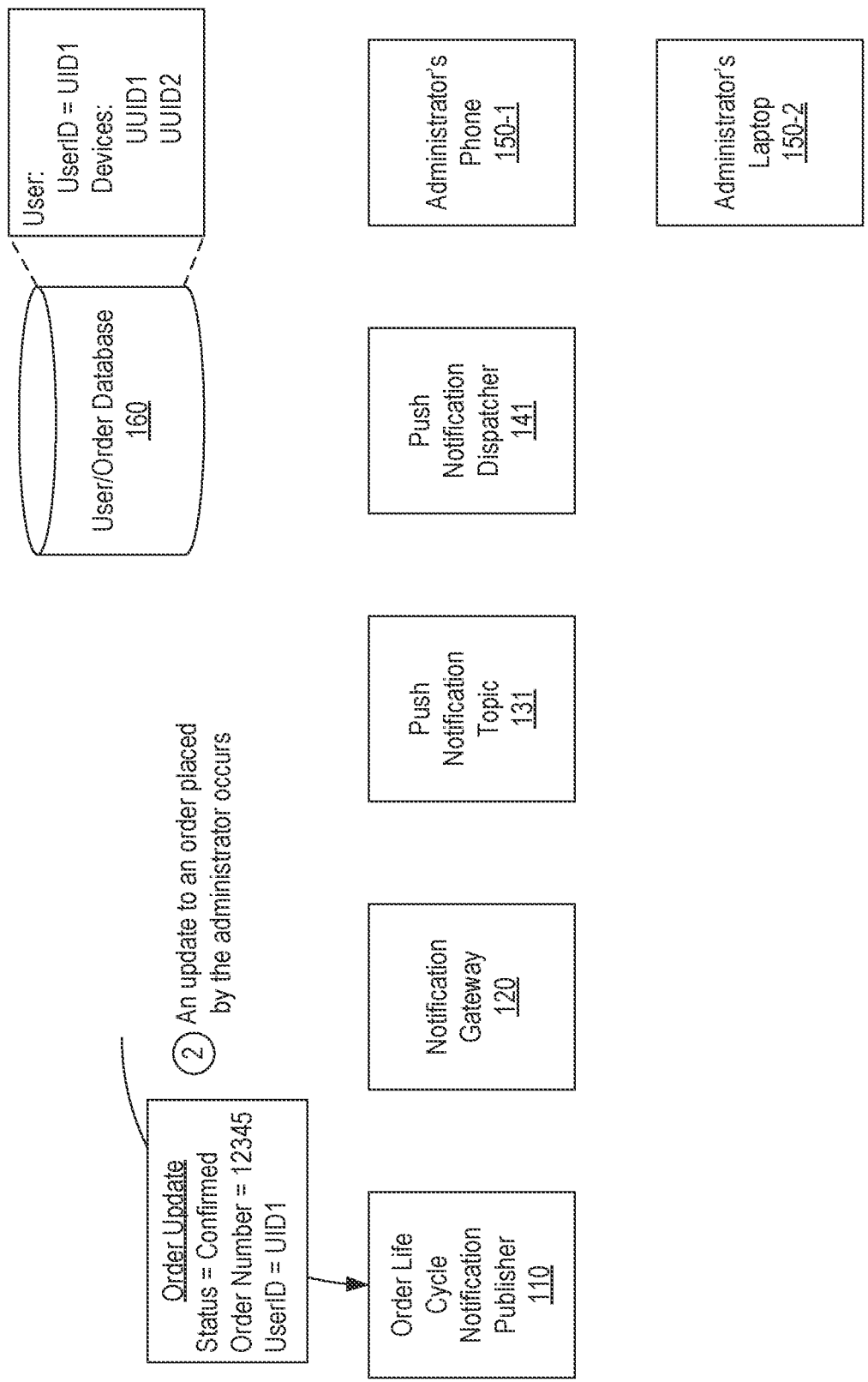

Turning to FIG. 3B, in step 2, an update to an order placed by the administrator may occur. In this example, it is assumed that this update is the confirmation of an order having an order number of 12345 that was placed by a user having a user ID of UID1. As shown, this information defining the update to the order can be obtained by order life cycle notification publisher 110 in any suitable manner.

Figure 3C:
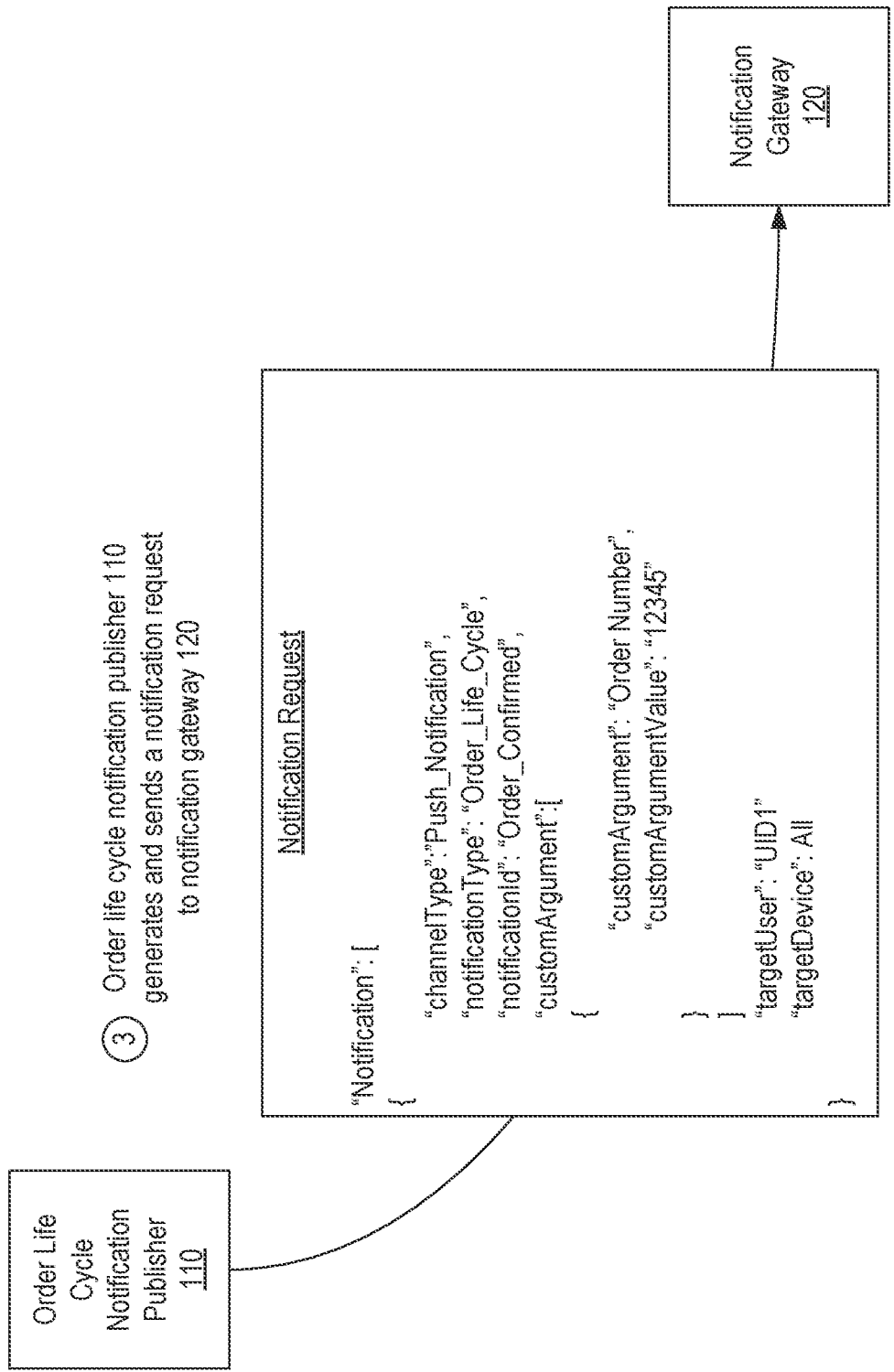

Turning to FIG. 3C, in step 3, order life cycle notification publisher 110 can generated and send a notification request to notification gateway 120. Notably, this notification request can include content defining a notification but does not need to comply with any requirements for the actual creation or delivery of the notification to a user device 150. For example, the notification request could be formatted as structured data (e.g., in JSON format) and can identify a channel type, a notification type, a notification ID, custom arguments, a target user, and target devices. In the depicted example, the channel type is push notification, the notification type is order life cycle, the notification ID is order confirmed, the custom argument specifies the order number of 12345, the target user is the user having a user ID of UID1, and the target devices are all of the user devices that the user having the user ID of UID1 uses.

Figure 3D:
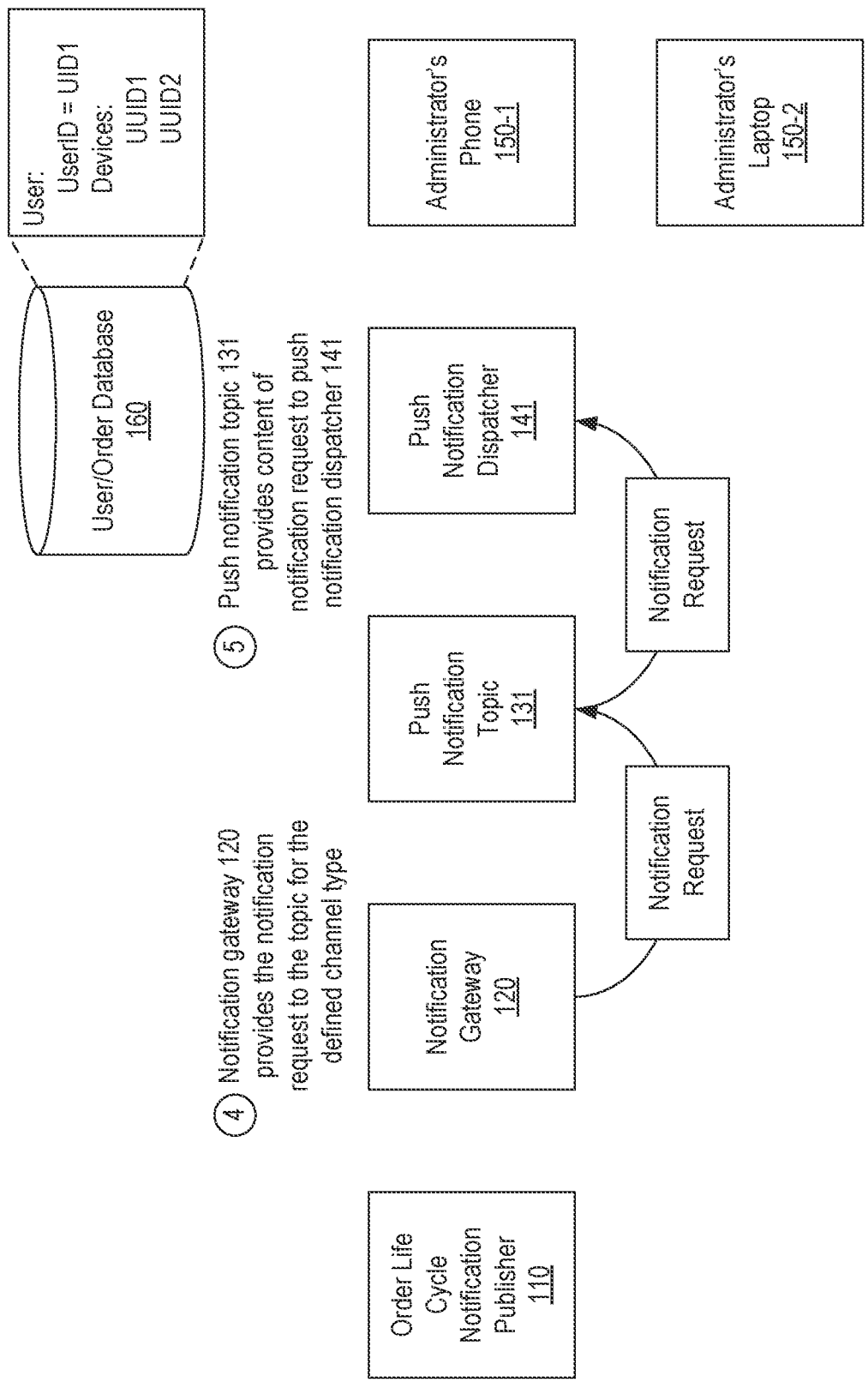

Turning to FIG. 3D, in step 4, notification gateway 120 can provide the notification request to the topic defined for the specified channel type. In particular, when notification gateway 120 receives a notification request from a publisher 110, it can identify the channel type specified in the notification request and then select the topic 131 associated with this channel type. Because the channel type in the depicted example is push notification, notification gateway 120 can select push notification topic 131 to receive the notification request.

In step 5, push notification topic 131 can provide the notification request (or content of the notification request) to any dispatcher 141 that is subscribed to the topic. In this example, push notification topic 131 can provide the content of the notification request to push notification dispatcher 141.

Figure 3E:
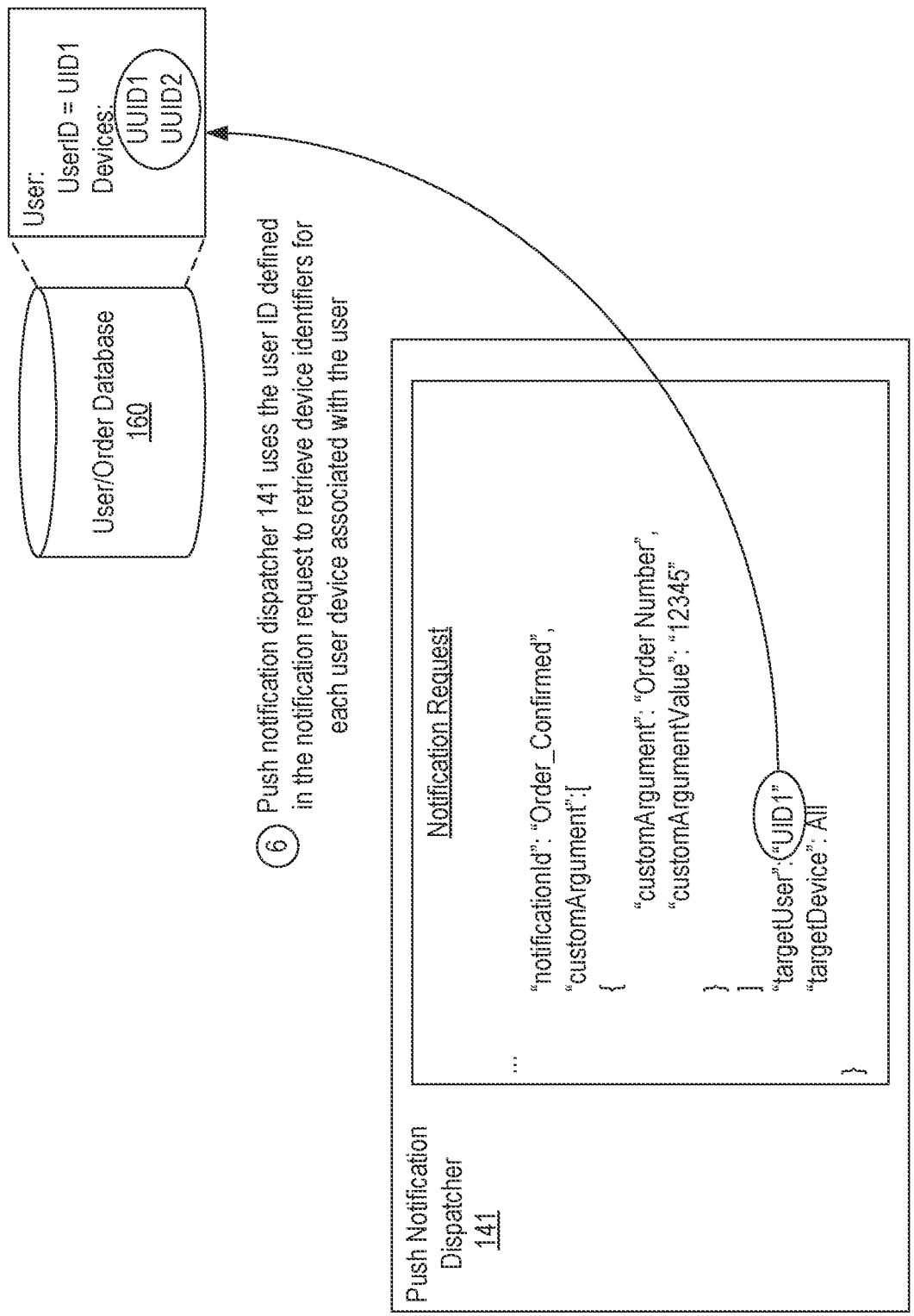

Turning to FIG. 3E, in step 6, push notification dispatcher 141 can access user/order database 160 to obtain a device list for the notification request. For example, push notification dispatcher 141 can extract the user ID, UID1, from the notification request and use it to query user/order database 160 to retrieve each device identifier associated with the user ID. In this case, push notification dispatcher 141 will retrieve the device identifiers of UUID1 and UUID2 in the list of devices that the user having the user ID of UID1 uses. In some embodiments, push notification dispatcher 141 could obtain additional information from user/order database 160 (or another database 160) using information contained in the notification request. For example, push notification dispatcher 141 could use the order number to query additional details about the order.

Figure 3F:
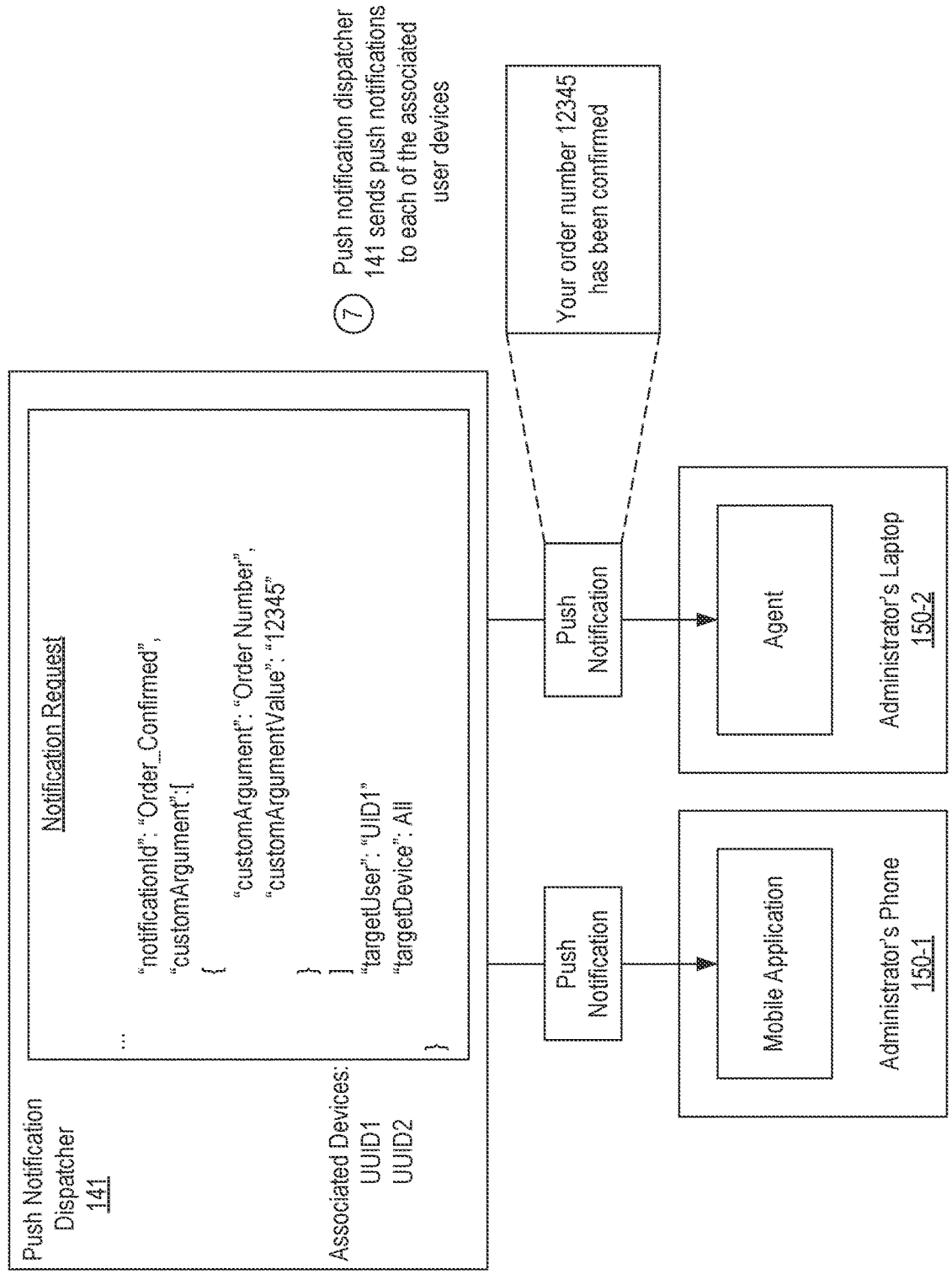

Turning to FIG. 3F, in step 7, push notification dispatcher 141 can generate and send push notifications to each of the devices identified in the device list. In this example, push notification dispatcher 141 can use the custom argument to create the content of the push notification and can use the device identifiers to deliver the push notifications to a mobile application on the administrator's phone 150-1 and an agent on the administrator's laptop 150-2. The notifications could be presented on user devices 150 in any suitable manner. For example, the mobile application on the administrator's phone 150-1 could post the notification via a notification service, and the agent on the administrator's laptop 150-2 could create a toast notification. As a result, a notification of "Your order number 12345 has been confirmed" is presented on the administrator's phone 150-1 and on the administrator's laptop 150-2 as a result of order life cycle notification publisher 110 sending the notification request to notification gateway 120.

In some embodiments, the notification that is presented on a user device 150 can be configured to redirect to take an action associated with the notification. For example, a notification initiated by a remediation publisher 110 that pertains to a driver issue could be configured to initiate the installation of a driver to remediate a detected driver issue.

Finally, turning to FIG. 3G, in step 8 and in response to the successful delivery of the push notifications, notification gateway 120 can send a notification response back to order life cycle notification publisher 110. This notification response can identify the channel type, the notification type, the target user, and the result.

FIG. 4 provides another example of a notification request. In this example, the notification request specifies a channel type of all channels, a notification type of system health, a notification ID of battery health, a custom argument defining the battery health, a target user of UID1 and target devices of all devices. Accordingly, when notification gateway 120 receives this notification request, it can deliver the notification request to all topics 131 to cause a corresponding notification to be delivered to all the administrator's devices via all available channels thereby maximizing the likelihood that the administrator will be immediately notified of the battery health issue.

As can be seen, embodiments of the present invention enable the delivery of different types of notifications via different channels to different user devices that a particular administrator may use. Embodiments of the present invention can therefore simplify the process of delivering notifications while also enhancing the administrator's ability to be timely notified.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing notifications across user devices associated with a first administrator, the method comprising:

receiving, at a notification gateway, a notification request from a first publisher, the notification request identifying a first channel type over which a particular notification is to be sent and the first administrator to whom the particular notification is to be sent;

providing, by the notification gateway, content of the notification request to a first dispatcher that is associated with the first channel type;

identifying, by the first dispatcher, the user devices associated with the first administrator, and generating and sending, by the first dispatcher, the particular notification to each of the user devices associated with the first administrator via the first channel type such that the first administrator receives the particular notification at each of the user devices associated with the first administrator.

2. The method of claim 1, wherein providing the content of the notification request to the first dispatcher comprises selecting a first topic that is associated with the first channel type.

3. The method of claim 2, wherein the first dispatcher is subscribed to the first topic.

4. The method of claim 1, wherein the content of the notification request that is provided to the first dispatcher includes a user identifier (ID) of the first administrator.

5. The method of claim 4, wherein the first dispatcher identifies the user devices associated with the first administrator using the user ID.

6. The method of claim 5, wherein the first dispatcher identifies the user devices associated with the first administrator using the user ID by querying a database for device identifiers that are associated with the user ID.

7. The method of claim 1, wherein the user devices are different types of user devices.

8. The method of claim 1, wherein the particular notification includes at least some of the content of the notification request.

9. The method of claim 1, further comprising:
sending, by the notification gateway, a notification response to the first publisher, the notification response identifying a result of the notification request.

10. The method of claim 1, further comprising:
receiving, at the notification gateway, a second notification request from a second publisher, the second notification request identifying a second channel type over which a second particular notification is to be sent and the first administrator to whom the second particular notification is to be sent;
providing, by the notification gateway, content of the second notification request to a second dispatcher that is associated with the second channel type;
identifying, by the second dispatcher, the user devices associated with the first administrator; and
generating and sending, by the second dispatcher, the second particular notification to each of the user devices associated with the first administrator via the second channel type such that the first administrator receives the second particular notification at each of the user devices associated with the first administrator.

11. The method of claim 1, further comprising:
receiving, at the notification gateway, a second notification request from the first publisher, the second notification request identifying the first channel type over which a second particular notification is to be sent and a second administrator to whom the second particular notification is to be sent;
providing, by the notification gateway, content of the second notification request to the first dispatcher;
identifying, by the first dispatcher, user devices associated with the second administrator, and
generating and sending, by the first dispatcher, the second particular notification to each of the user devices associated with the second administrator via the first channel type such that the second administrator receives the second particular notification at each of the user devices associated with the second administrator.

12. A system comprising:
a notification gateway comprising one or more hardware processors;
a plurality of publishers that are configured to provide notification requests to the notification gateway, each of the notification requests identifying a particular channel type of multiple possible channel types over which a particular notification is to be sent and a particular administrator to whom the respective particular notification is to be sent;
a plurality of topics, each topic being configured to receive notification requests from the notification gateway that define one of the particular channel types; and
a plurality of dispatchers, each dispatcher being configured to receive notification requests from a particular topic of the plurality of topics and, for each notification request, generate and send the respective particular notification to each of one or more user devices associated with the respective particular administrator identified in the respective notification request.

13. The system of claim 12, wherein the notification requests received by each dispatcher identify a channel type, a notification type, and a user identifier (ID).

14. The system of claim 13, wherein each dispatcher is configured to identify the one or more user devices using the user ID defined in the corresponding notification request.

15. The system of claim 14, wherein the one or more user devices comprise different types of user devices.

16. One or more computer storage media storing computer executable instructions which when executed implement a method for providing notifications across user devices associated with a first administrator, the method comprising:
receiving, at a notification gateway, a notification request from a first publisher, the notification request identifying a first channel type over which a particular notification is to be sent and the first administrator to whom the particular notification is to be sent;
providing, by the notification gateway, content of the notification request to a first dispatcher that is associated with the first channel type;
identifying, by the first dispatcher, the user devices associated with the first administrator, and
generating and sending, by the first dispatcher, the particular notification to each of the user devices associated with the first administrator via the first channel type such that the first administrator receives the particular notification at each of the user devices associated with the first administrator.

17. The one or more computer storage media of claim 16, wherein providing the content of the notification request to the first dispatcher comprises selecting a first topic that is associated with the first channel type, the first dispatcher being subscribed to the first topic.

18. The one or more computer storage media of claim 16, wherein the first publisher provides notification requests pertaining to health or status of user devices.

19. The one or more computer storage media of claim 16, wherein the first publisher provides notification requests pertaining to orders for user devices.

20. The one or more computer storage media of claim 16, wherein the user devices associated with the first administrator are different types of user devices.

* * * * *